(12) United States Patent
Miyamoto et al.

(10) Patent No.: US 8,330,877 B2
(45) Date of Patent: Dec. 11, 2012

(54) SELF-EXCITED INVERTER AND LCD TELEVISION APPARATUS

(75) Inventors: Hitoshi Miyamoto, Daito (JP); Takashi Jinnouchi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1168 days.

(21) Appl. No.: 12/182,853

(22) Filed: Jul. 30, 2008

(65) Prior Publication Data
US 2009/0033810 A1 Feb. 5, 2009

(30) Foreign Application Priority Data

Jul. 30, 2007 (JP) ................................ 2007-197828

(51) Int. Cl.
H04N 3/14 (2006.01)
(52) U.S. Cl. ........................................ 348/790; 348/730
(58) Field of Classification Search .................. 348/730, 348/790
See application file for complete search history.

(56) References Cited

U.S. PATENT DOCUMENTS

| | | | | | |
|---|---|---|---|---|---|
| 4,975,692 | A | * | 12/1990 | Tateyama | 345/102 |
| 5,576,863 | A | * | 11/1996 | Aoki et al. | 349/124 |
| 6,104,147 | A | * | 8/2000 | Nakamura et al. | 315/289 |
| 2001/0019492 | A1 | * | 9/2001 | Burton | 363/21.12 |

FOREIGN PATENT DOCUMENTS

| | | |
|---|---|---|
| JP | 2001-110582 | 4/2001 |
| JP | 2002-334779 | 11/2002 |
| JP | 3112144 | 6/2005 |
| JP | 2005-332710 | 12/2005 |
| JP | 3119099 | 1/2006 |
| WO | 01/61832 A2 | 8/2001 |

OTHER PUBLICATIONS

European Search Report for European Application No. 08 01 3631, dated Dec. 2, 2008 (5 pages).
Patent Abstracts of Japan, Publication No. 2002-334779, Publication Date: Nov. 22, 2002 (1 Page).
Patent Abstracts of Japan, Publication No. 2001-110582, Publication Date: Apr. 20, 2001 (1 Page).
Patent Abstracts of Japan, Publication No. 2005-332710, Publication Date: Dec. 2, 2005 (1 Page).

* cited by examiner

*Primary Examiner* — Pankaj Kumar
*Assistant Examiner* — Charles N Hicks
(74) *Attorney, Agent, or Firm* — Osha Liang LLP

(57) ABSTRACT

A self-excited inverter comprises a pair of switching devices and a transformer having a primary side to which the switching devices are connected and a secondary side to which a lamp is connected. A pulse voltage is applied alternately to gates of the individual switching devices through a drive winding of the transformer, causing the switching devices to turn on and off in alternate turns to produce an AC voltage which is supplied from a pair of main windings of the transformer to the secondary side thereof. An input voltage supplied to the main windings of the transformer is divided by a voltage divider circuit configured with a plurality of resistors and voltages divided by the voltage divider circuit are applied to the gates of the individual switching devices so that the startup voltage follows the input voltage.

4 Claims, 3 Drawing Sheets

SELF-EXCITED INVERTER AND LCD TELEVISION APPARATUS

BACKGROUND OF THE INVENTION

1. Field of the Invention

The present invention relates to a self-excited inverter including a pair of switching devices which are turned alternately on and off for generating an AC voltage as well as to a liquid crystal display (hereinafter referred to as LCD) television apparatus employing the self-excited inverter.

2. Description of the Related Art

An LCD television apparatus often employs an inverter for converting DC power into AC power as a power source for driving a cold cathode fluorescent lamp (CCFL) which is used as a light source for backlighting an LCD panel. Japanese Registered Utility Model Nos. 3112144 and 3119099 and Japanese Laid-open Patent Application Nos. 2001-110582, 2002-334779 and 2005-332710 describe inverters for driving illumination devices. The inverters described in Japanese Registered Utility Model Nos. 3112144 and 3119099 and Japanese Laid-open Patent Application No. 2002-334779 are self-excited inverters, while the inverters described in Japanese Laid-open Patent Application Nos. 2001-110582 and 2005-332710 are separately-excited inverters.

FIG. 3 is a circuit diagram showing an example of a self-excited inverter conventionally used as a power source for driving a backlight. The self-excited inverter 8a includes a pair of switching devices Q1, Q2, which may be field effect transistors (hereinafter referred to as FETs), for example, and a transformer T whose primary side is connected to the individual switching devices Q1, Q2 and secondary side is connected to a lamp 6, such as a CCFL. The transformer T has a pair of main windings W1, W2 and a drive winding W3 wound on the primary side. The switching devices Q1, Q2 are connected to the two main windings W1, W2, respectively. In FIG. 3, W4 is a secondary winding of the transformer T, R1 and R3-R8 are resistors, C is a capacitor, L is a resonating coil, and ZD is a Zener diode.

In this self-excited inverter 8a, the switching devices Q1, Q2 are alternately turned on and off by applying a pulse voltage alternately to gates of the switching devices Q1, Q2 through the drive winding W3. As a result, AC voltage is supplied to the secondary side of the transformer T through the main windings W1 and W2 for lighting the lamp 6.

When starting up the self-excited inverter 8a of FIG. 3, an input voltage (DC voltage) Vin is applied to the gates of the switching devices Q1, Q2 as a startup voltage through the resistors R1, R3-R6. This startup voltage is clamped at a constant voltage level by the Zener diode ZD. Specifically, a point y shown in FIG. 3, which is a connecting point between the resistor R1 and the Zener diode ZD, is constantly held at a fixed potential. This arrangement is adopted in the self-excited inverter disclosed in the aforementioned Japanese Registered Utility Model No. 3112144 as well; a startup voltage applied to gates of switching devices is clamped by a Zener diode (refer to FIG. 3 of the pertinent Utility Model application).

If the self-excited inverter 8a is configured to clamp the startup voltage at the constant voltage level as mentioned above, however, the startup voltage applied to the gates of the switching devices Q1, Q2 would not vary even when the input voltage Vin is reduced to regulate illumination level by the lamp 6 for reducing LCD screen brightness. On the other hand, a pulse voltage produced by the drive winding W3 drops when the input voltage Vin is reduced. Consequently, the startup voltage applied to the switching devices Q1, Q2 may become higher than the voltage produced by the drive winding W3, potentially causing the switching devices Q1, Q2 to turn on simultaneously. If the two switching devices Q1, Q2 turn on simultaneously in this way, it becomes impossible for the self-excited inverter 8a to maintain a state of normal self-excited oscillation, possibly leading to burnout of the switching devices Q1, Q2 in extreme cases. This will result in interruption of oscillation of the self-excited inverter 8a and extinction of the lamp 6.

SUMMARY OF THE INVENTION

In light of the foregoing, it is an object of the present invention to provide a self-excited inverter which can prevent simultaneous turning on of switching devices when regulating illumination level, allowing for achievement of a stable lamp lighting state.

According to one aspect of the invention, a self-excited inverter comprises a pair of switching devices and a transformer having a primary side to which the switching devices are connected and a secondary side to which a lamp is connected, the transformer including a pair of main windings and a drive winding disposed on the primary side, the switching devices being connected to the individual main windings. In this self-excited inverter, a pulse voltage is applied alternately to gates of the individual switching devices through the drive winding, causing the switching devices to turn on and off in alternate turns to produce an AC voltage which is supplied from the main windings to the secondary side of the transformer, wherein a startup voltage applied to the gates of the pair of switching devices is controlled to follow an input voltage supplied to the main windings of the transformer.

In the self-excited inverter of the invention thus configured, the startup voltage applied to the gates of the individual switching devices varies following the input voltage. Thus, when the input voltage of the self-excited inverter is lowered to reduce LCD screen brightness by regulating illumination level of the lamp, the startup voltage applied to the gates of the individual switching devices also drops according to a reduction in the input voltage. Therefore, unlike a case where the startup voltage is clamped at a constant voltage level as in the aforementioned conventional self-excited inverter, the startup voltage would in no case become higher than a voltage produced by the drive winding, so that the switching devices would never turn on simultaneously. This feature of the invention serves to prevent interruption of oscillation of the inverter and burnout of the switching devices and keep the lamp in a stably lit state.

Preferably, the self-excited inverter further comprises a voltage divider circuit configured with a plurality of resistors for dividing the input voltage and applying divided voltages to the gates of the individual switching devices, thereby causing the startup voltage to follow the input voltage. The self-excited inverter thus configured, in which one of the resistors simply substitutes for the Zener diode used in the previously described conventional self-excited inverter, causes the startup voltage of the switching devices to automatically follow the input voltage. Hence, the aforementioned embodiment has the advantage that it can be realized with the simple circuit configurations.

According to another aspect of the invention, an LCD television apparatus comprises an LCD panel for displaying a television picture, a lamp for backlighting the LCD panel, and an inverter for supplying power to the lamp, wherein the inverter is the aforementioned self-excited inverter of the present invention.

Employing the self-excited inverter of the invention in the LCD television apparatus as a power supply for LCD backlighting, it is possible to keep the backlighting lamp in a stably lit state and maintain stable brightness of the LCD panel when regulating illumination level.

According to the present invention, the startup voltage applied to the individual switching devices varies following the input voltage. It is therefore possible to maintain the lamp in a stably lit state while preventing the switching devices from simultaneously turning on or accidentally burning out.

These and other objects, features and advantages of the invention will become more apparent upon a reading of the following detailed description in conjunction with the accompanying drawings.

DETAILED DESCRIPTION OF THE PREFERRED EMBODIMENT

The invention is now described in detail with reference to a preferred embodiment thereof and the accompanying drawings.

Figure 1:
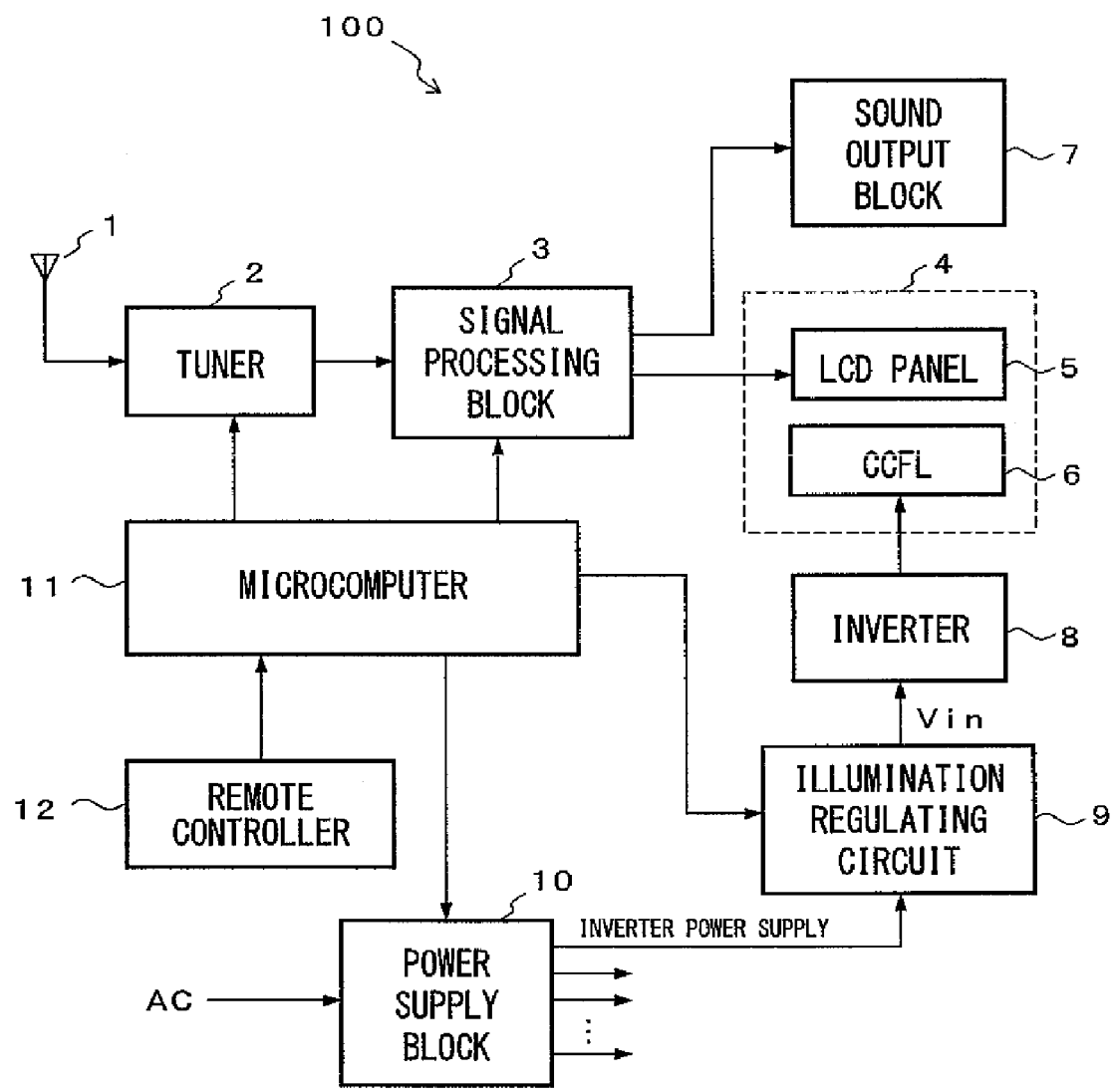
FIG. 1 is a block diagram of an example of an LCD television set according to a preferred embodiment of the invention.

FIG. 1 is a block diagram of an example of an LCD television set 100 according to the preferred embodiment of the invention. The LCD television set 100 comprises an antenna 1 for receiving broadcast radio waves, a tuner 2 for extracting a television signal of a selected channel from among the broadcast radio waves received by the antenna 1, a signal processing block 3 for processing the extracted television signal and a monitor 4 for displaying a television picture based on a video signal produced by the signal processing block 3 by processing the television signal. The monitor 4 includes an LCD panel 5 for displaying the television picture and a lamp 6 for backlighting the LCD panel 5. The lamp 6 used in this embodiment is a CCFL. The LCD television set 100 also comprises a sound output block 7 which outputs sound based on an audio signal produced by the signal processing block 3 by processing the television signal, the sound output block 7 including an amplifier and a loudspeaker.

As depicted in FIG. 1, the LCD television set 100 further comprises a later-described self-excited inverter 8 serving as a power source for supplying power to the lamp 6 for backlighting, an illumination regulating circuit 9 including a pulse width modulation (PWM) circuit for regulating brightness of the lamp 6. An output of the illumination regulating circuit 9 is delivered to the inverter 8 as a DC input voltage Vin. The LCD television set 100 further comprises a power supply block 10 for producing power sources to be supplied to the inverter 8 and other blocks from a commercial AC power supply, a microcomputer 11 serving as a control block for controlling the individual blocks, and a remote controller 12 serving as an operating device which permits a user to enter particular kinds of control commands to be given to the LCD television set 100.

Figure 2:
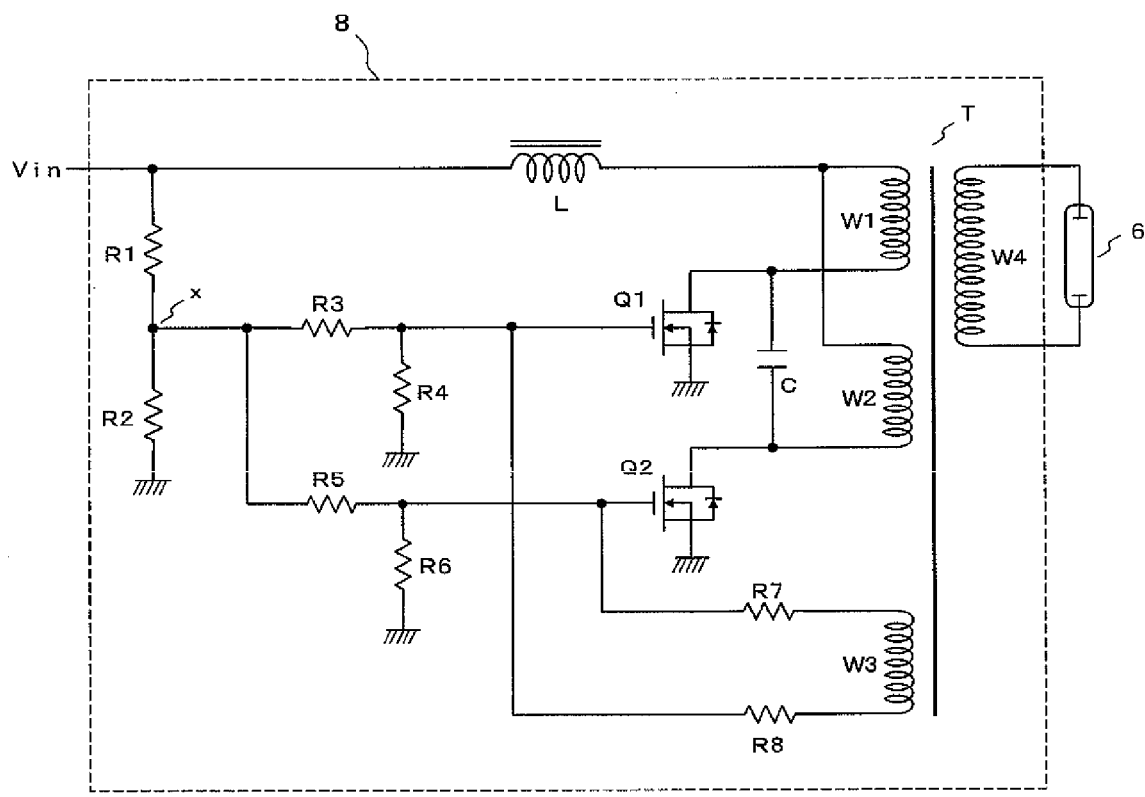
FIG. 2 is a circuit diagram of an example of a self-excited inverter used in the LCD television set of the embodiment of the invention.
Figure 3:
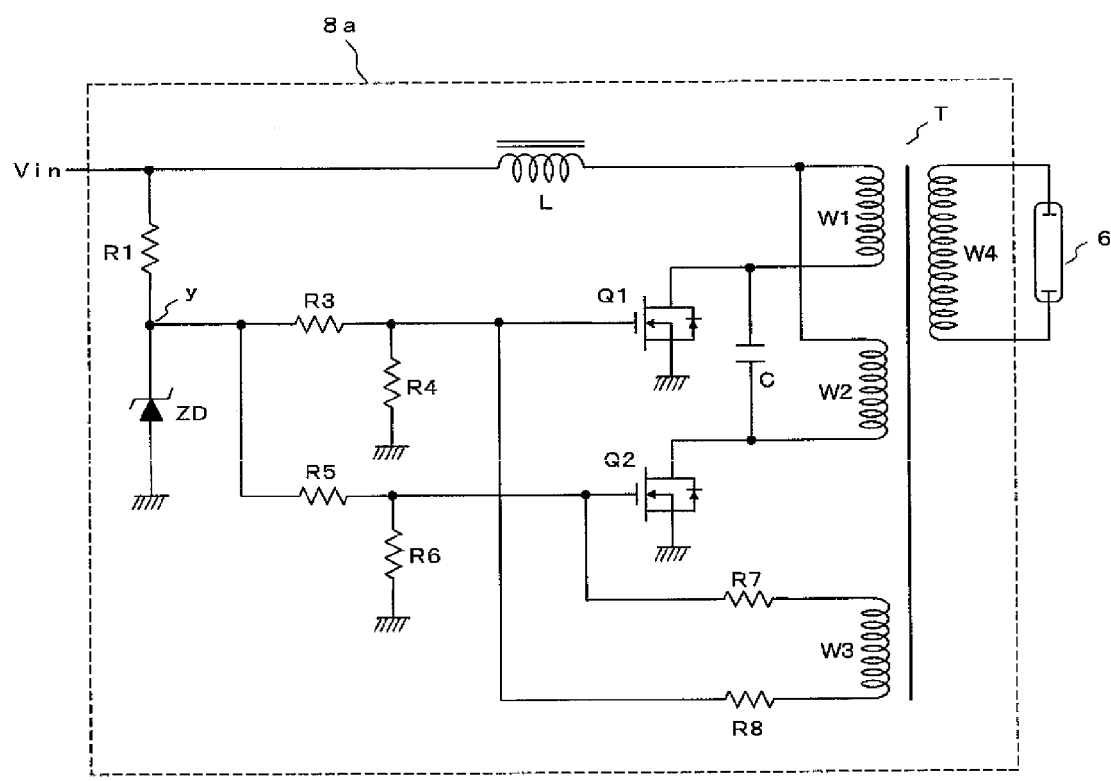
FIG. 3 is a circuit diagram of an example of a conventional self-excited inverter.

FIG. 2 is a circuit diagram specifically showing an exemplary configuration of the self-excited inverter 8 used in the LCD television set 100 of FIG. 1, in which elements identical or similar to those shown in FIG. 3 are designated by the same symbols.

The self-excited inverter 8 includes a pair of switching devices Q1, Q2, which may be FETs, for example, and a transformer T whose primary side is connected to the individual switching devices Q1, Q2 and secondary side is connected to the lamp 6. The transformer T is provided on the primary side thereof with a pair of main windings W1, W2 to which the switching devices Q1, Q2 are connected. The transformer T is also provided on the primary side thereof with a drive winding W3 which is connected to gates of the switching devices Q1, Q2 through resistors R7, R8, respectively. W4 is a secondary winding of the transformer T, both ends of the secondary winding W4 being connected to the lamp 6. L and C on the primary side of the transformer T are a resonating coil and a capacitor, respectively.

R1-R6 in FIG. 2 are resistors constituting a voltage divider circuit for dividing the DC input voltage Vin supplied from the illumination regulating circuit 9 (FIG. 1) to the inverter 8. The resistors R1 and R2 are connected in series and a connecting point x between them is connected to the gate of the switching device Q1 through the resistor R3 as well as to the gate of the switching device Q2 through the resistor R5. The resistor R4 is connected between the gate of the switching device Q1 and a grounding point, while the resistor R6 is connected between the gate of the switching device Q2 and the grounding point.

As is apparent from a comparison between the circuit configuration of FIG. 2 and that of FIG. 3, the inverter 8 of the embodiment employs the resistor R2 instead of the Zener diode ZD used in the conventional self-excited inverter 8a. The circuit configuration of FIG. 2 is otherwise the same as that of FIG. 3.

When starting up the inverter 8 of FIG. 2, the input voltage Vin is applied to the gates of the switching devices Q1, Q2 as a startup voltage through the resistors R1-R6. This startup voltage causes one of the switching devices Q1, Q2 to turn on, thereby causing the inverter 8 to oscillate. When the inverter 8 initiates oscillation in this fashion, a pulse voltage is applied from the drive winding W3 alternately to the gates of the switching devices Q1, Q2, causing the switching devices Q1, Q2 to turn on and off in alternate turns. Consequently, the inverter 8 produces uninterrupted self-excited oscillation and an AC voltage generated by alternate switching to on/off states of the switching devices Q1, Q2 is supplied to the secondary side of the transformer T through the main windings W1, W2, thereby lighting the lamp 6 connected to the secondary winding W4.

The startup voltage applied to the gates of the switching devices Q1 Q2 is supplied from the connecting point x of the two resistors R1, R2. Since the connecting point x has a potential which follows up the input voltage Vin, the startup voltage applied to the switching devices Q1, Q2 also varies following the input voltage Vin. Therefore, if the user attempts to reduce brightness of the LCD panel 5 by operating the remote controller 12, a relevant control command is given from the microcomputer 11 to the illumination regulating circuit 9 to lower the input voltage Vin supplied from the illumination regulating circuit 9 to the inverter 8. As a consequence, the pulse voltage produced by the drive winding W3 drops, while the startup voltage applied to the gates of the switching devices Q1, Q2 also drops in response to a drop in the input voltage Vin. Therefore, the startup voltage would in no case become higher than the voltage produced by the drive winding W3, so that the switching devices Q1, Q2 would never turn on simultaneously. This feature of the embodiment serves to prevent interruption of oscillation of the inverter 8 and burnout of the switching devices Q1, Q2 and keep the lamp 6 in a stably lit state.

Also, the inverter 8 of the present embodiment is configured so as to divide the input voltage Vin by the resistors R1-R6 and apply the divided voltages to the gates of the individual switching devices Q1, Q2 so that the startup voltage follows the input voltage Vin. This feature of the embodiment, in which the resistor R2 simply substitutes for the Zener diode ZD of FIG. 3, causes the startup voltage of the switching devices Q1, Q2 to automatically follow the input voltage Vin. Hence, the aforementioned embodiment has the advantage that it can be realized with the simple circuit configurations.

Furthermore, employing the self-excited inverter 8 in the LCD television set 100 of FIG. 1 of the embodiment as a power supply for LCD backlighting, it is possible to keep the lamp in a stably lit state and maintain stable brightness of the LCD panel 5 when regulating illumination level.

While the invention has thus far been described by way of example with reference to the preferred embodiment thereof, the invention is not limited to this embodiment but may be modified or varied in many ways. For example, devices like insulated-gate bipolar transistors (IGBTs) may be used instead of FETs as the switching devices Q1, Q2. Also, the backlighting lamp 6 need not necessarily be a CCFL but may be an external-electrode fluorescent lamp (EEFL).

Furthermore, although the inverter 8 of the foregoing embodiment employs an arrangement for dividing the input voltage Vin by the resistors R1-R6 and supplying the divided voltages to the gates of the individual switching devices Q1, Q2 as means for causing the startup voltage of the switching devices Q1, Q2 to follow the input voltage Vin, the invention is not limited to this arrangement but may employ a different arrangement. For example, the inverter 8 may be configured to include a circuit added to the gates of the switching devices Q1, Q2 for lowering the startup voltage according to a command given from the microcomputer 11 when regulating the LCD panel illumination level (or when reducing the LCD screen brightness) so that the startup voltage will follow the input voltage Vin.

What is claimed is:

1. A self-excited inverter comprising:
   a pair of switching devices; and
   a transformer having a primary side to which said switching devices are connected and a secondary side to which a lamp is connected, said transformer including a pair of main windings and a drive winding disposed on the primary side, said switching devices being connected to said individual main windings;
   wherein a pulse voltage is applied alternately to gates of said individual switching devices through said drive winding, causing said switching devices to turn on and off in alternate turns to produce an AC voltage supplied from said main windings to the secondary side of said transformer;
   wherein a startup voltage applied to the gates of said pair of switching devices is controlled to follow an input voltage supplied to said main windings of said transformer,
   wherein the pulse voltage is controlled to follow the input voltage, and
   wherein the self-excited inverter is configured so that the startup voltage and the pulse voltage both drop in response to a drop in the input voltage.

2. The self-excited inverter according to claim 1 further comprising a voltage divider circuit configured with a plurality of resistors for dividing the input voltage and applying divided voltages to the gates of said individual switching devices, thereby causing the startup voltage to follow the input voltage.

3. An LCD television apparatus comprising:
   an LCD panel for displaying a television picture;
   a lamp for backlighting said LCD panel; and
   an inverter for supplying power to said lamp;
   wherein said inverter is a self-excited inverter as defined in claim 1.

4. An LCD television apparatus comprising:
   an LCD panel for displaying a television picture;
   a lamp for backlighting said LCD panel; and
   an inverter for supplying power to said lamp;
   wherein said inverter is a self-excited inverter as defined in claim 2.

* * * * *